United States Patent
Fincke

(10) Patent No.: US 6,622,574 B2
(45) Date of Patent: *Sep. 23, 2003

(54) OIL FIELD MANAGEMENT SYSTEM

(75) Inventor: James R. Fincke, Idaho Falls, ID (US)

(73) Assignee: Bechtel BWXT Idaho, LLC, Idaho Falls, ID (US)

( * ) Notice: Subject to any disclaimer, the term of this patent is extended or adjusted under 35 U.S.C. 154(b) by 95 days.

This patent is subject to a terminal disclaimer.

(21) Appl. No.: 09/935,346

(22) Filed: Aug. 21, 2001

(65) Prior Publication Data

US 2002/0016688 A1 Feb. 7, 2002

Related U.S. Application Data

(63) Continuation of application No. 09/401,375, filed on Sep. 22, 1999, which is a continuation-in-part of application No. 08/937,120, filed on Sep. 24, 1997, now abandoned.

(51) Int. Cl.$^7$ ............................. G01F 1/44; G01F 1/74
(52) U.S. Cl. ............................. 73/861.63; 73/861.04; 702/50
(58) Field of Search ................. 73/861.04, 861.03; 702/50, 47

(56) References Cited

U.S. PATENT DOCUMENTS

| | | | |
|---|---|---|---|
| 2,984,105 A | | 5/1961 | Nagel et al. |
| 4,048,854 A | * | 9/1977 | Herzl ........................ 73/194 |
| 4,231,262 A | * | 11/1980 | Boll, deceased et al. 73/861.04 |
| 4,312,234 A | | 1/1982 | Rhodes et al. |
| 4,404,859 A | | 9/1983 | Ohsawa et al. |
| 4,449,401 A | | 5/1984 | Kaiser et al. |
| 4,604,902 A | * | 8/1986 | Sabin et al. ............. 73/861.04 |
| 4,730,480 A | | 3/1988 | Mayo et al. |
| 4,757,709 A | | 7/1988 | Czernichow |
| 4,856,344 A | | 8/1989 | Hunt |
| 4,975,645 A | * | 12/1990 | Lucas ...................... 73/861.04 |
| 5,099,697 A | * | 3/1992 | Agar ....................... 73/861.04 |
| 5,135,684 A | | 8/1992 | Mohn et al. |
| 5,199,306 A | * | 4/1993 | Hunter .................... 73/861.63 |
| 5,207,107 A | | 5/1993 | Wolf et al. |
| 5,307,832 A | | 5/1994 | Stoy et al. |
| 5,400,657 A | | 3/1995 | Kolpak et al. |
| 5,461,930 A | | 10/1995 | Farchi et al. |
| 5,501,099 A | | 3/1996 | Whorff |
| 5,526,684 A | | 6/1996 | Liu et al. |
| 5,535,632 A | * | 7/1996 | Kolpak .................... 73/861.04 |
| 5,551,305 A | | 9/1996 | Farchi et al. |
| 5,591,922 A | * | 1/1997 | Segeral et al. .......... 73/861.04 |
| 5,597,961 A | | 1/1997 | Marrelli |
| 5,600,073 A | * | 2/1997 | Hill ........................ 73/861.04 |
| 5,660,909 A | | 8/1997 | Tachibana et al. |
| 5,693,891 A | * | 12/1997 | Brown et al. ........... 73/861.04 |
| 5,736,650 A | * | 4/1998 | Hiron et al. ............. 73/861.63 |
| 5,869,771 A | | 2/1999 | Rajan et al. |
| 6,250,131 B1 | * | 6/2001 | Pauley et al. ............ 73/19.05 |
| 6,286,367 B1 | * | 9/2001 | Segeral ................... 73/861.63 |
| 6,332,111 B1 | | 12/2001 | Fincke |
| 6,338,276 B1 | * | 1/2002 | Durando et al. ........ 73/861.04 |

OTHER PUBLICATIONS

Baker, R., "Measuring Multiphase Flow", The Chemical Engineer, No. 453, pp. 39–45, Oct. 1988.

* cited by examiner

Primary Examiner—Harshad Patel
(74) Attorney, Agent, or Firm—Workman Nydegger & Seeley

(57) ABSTRACT

Oil field management systems and methods for managing operation of one or more wells producing a high void fraction multiphase flow. The system includes a differential pressure flow meter which samples pressure readings at various points of interest throughout the system and uses pressure differentials derived from the pressure readings to determine gas and liquid phase mass flow rates of the high void fraction multiphase flow. One or both of the gas and liquid phase mass flow rates are then compared with predetermined criteria. In the event such mass flow rates satisfy the predetermined criteria, a well control system implements a correlating adjustment action respecting the multiphase flow. In this way, various parameters regarding the high void fraction multiphase flow are used as control inputs to the well control system and thus facilitate management of well operations.

54 Claims, 5 Drawing Sheets

OIL FIELD MANAGEMENT SYSTEM

RELATED APPLICATIONS

This application is a continuation of U.S. patent application Ser. No. 09/401,375, entitled IMPROVED METHOD AND SYSTEM FOR MEASURING MULTIPHASE FLOW USING MULTIPLE PRESSURE DIFFERENTIALS (which is a continuation-in-part of U.S. patent application Ser. No. 08/937,120 filed Sep. 24, 1997, now abandoned), filed Sep. 22, 1999, and incorporated herein in its entirety by this reference.

CONTRACTUAL ORIGIN OF THE INVENTION

This invention was made with United States Government support under Contract No. DE-AC07 94ID13223, now Contract No. DE-AC07-99ID13727 awarded by the United States Department of Energy. The United States Government has certain rights in the invention.

BACKGROUND OF THE INVENTION

1. Field of the Invention

The present invention relates to a flow meter for measuring the flow of very high void fraction multi-phase fluid streams. More particularly, the present invention relates to an apparatus and method in which multiple pressure differentials are used to determine flow rates of gas and liquid phases of a predominantly gas fluid stream to thereby determine the mass flow rate of each phase.

2. State of the Art

There are many situations where it is desirable to monitor multi-phase fluid streams prior to separation. For example, in oil well or gas well management, it is important to know the relative quantities of gas and liquid in a multi-phase fluid stream, to thereby enable determination of the amount of gas, etc. actually obtained. This is of critical importance in situations, such as off-shore drilling, in which it is common for the production lines of several different companies to be tied into a common distribution line to carry the fuel back to shore. While a common method for metering a gas is to separate out the liquid phase, such a system in not desirable for fiscal reasons. When multiple production lines feed into a common distribution line, it is important to know the flow rates from each production line to thereby provide an accurate accounting for the production facilities.

In recent years, the metering of multi-phase fluid streams prior to separation has achieved increased attention. Significant progress has been made in the metering of multi-phase fluids by first homogenizing the flow in a mixer then metering the pseudo single phase fluid in a venturi in concert with a gamma densitometer or similar device. This approach relies on the successful creation of a homogenous mixture with equal phase velocities, which behaves as if it were a single phase fluid with mixture density $\bar{\rho}=\alpha\rho_g+(1-\alpha)\rho_l$ where $\alpha$ is the volume fraction of the gas phase, and $\rho_g$ is the gas phase density and $\rho_1$ is the liquid phase density. This technique works well for flows which after homogenizing the continuous phase is a liquid phase. While the upper limit of applicability of this approach is ill defined, it is generally agreed that for void fractions greater than about ninety to ninety-five percent (90–95%) a homogenous mixture is difficult to create or sustain. The characteristic undisturbed flow regime in this void fraction range is that of an annular or ring shaped flow configuration. The gas phase flows in the center of the channel and the liquid phase adheres to and travels along the sidewall of the conduit as a thick film. Depending on the relative flow rates of each phase, significant amounts of the denser phase may also become entrained in the gas phase and be conveyed as dispersed droplets. Nonetheless, a liquid film is always present on the wall of the conduit. While the liquid generally occupies less than five percent (5%) of the cross-sectional volume of the flow channel, the mass flow rate of the liquid may be comparable to or even several times greater than that of the gas phase due to its greater density.

The fact that the phases are partially or fully separated, and consequently have phase velocities which are significantly different (slip), complicates the metering problem. The presence of the liquid phase distorts the gas mass flow rate measurements and causes conventional meters, such as orifice plates or venturi meters, to overestimate the flow rate of the gas phase. For example the gas mass flow can be estimated using the standard equation $$m_g = \frac{AC_cY}{\sqrt{1-\beta^4}}\sqrt{2\rho_g \Delta P} \qquad [7]$$

where $m_g$ is the gas mass flow rate, A is the area of the throat, $\Delta P$ is the measured pressure differential, $\rho_g$ the gas density at flow conditions, $C_c$ the discharge coefficient, and Y is the expansion factor. In test samples using void fractions ranging from 0.997 to 0.95, the error in the measured gas mass flow rate ranges from 7% to 30%. It is important to note that the presence of the liquid phase increases the pressure drop in the venturi and results in over-predicting the true gas mass flow rate. The pressure drop is caused by the interaction between the gas and liquid phases. Liquid droplet acceleration by the gas, irreversible drag force work done by the gas phase in accelerating the liquid film and wall losses determine the magnitude of the observed pressure drop. In addition, the flow is complicated by the continuous entrainment of liquid into the gas, the redeposition of liquid from the gas into the liquid film along the venturi length, and also by the presence of surface waves on the surface of the annular or ringed liquid phase film. The surface waves on the liquid create a roughened surface over which the gas must flow increasing the momentum loss due to the addition of drag at the liquid/gas interface.

Other simple solutions have been proposed to solve the overestimation of gas mass flow rate under multi-phase conditions. For example, Murdock, ignores any interaction (momentum exchange) between the gas and liquid phases and proposed to calculate the gas mass flow if the ratio of gas to liquid mass flow is known in advance. See Murdock, J. W. (1962). Two Phase Flow Measurement with Orifices, ASME Journal of Basic Engineering, December, 419–433. Unfortunately this method still has up to a 20% error rate or more.

While past attempts at metering multi-phase fluid streams have produced acceptable results below the ninety to ninety five percent (90–95%) void fraction range, they have not provided satisfactory metering for the very high void multi-phase flows which have less than five to ten (5–10%) non-gas phase by volume. When discussing large amounts of natural gas or other fuel, even a few percent difference in the amount of non-gas phase can mean substantial differences in the value of a production facility. For example, if there are two wells which produce equal amounts of natural gas per day. The first well produces, by volume, 1% liquid and the second well produces 5% liquid. If a conventional mass flow rate meter is relied upon to determine the amount of gas produced, the second well will erroneously appear to produce as much as 20–30% more gas than the first well. Suppose further that the liquid produced is a light hydrocarbon liquid (e.g. a gas condensate such as butane or propane) which is valuable in addition to the natural gas produced. Conventional meters will provide no information about the amount of liquid produced. Then if the amount of liquid produced is equally divided between the two wells, the value of the production from the first well will be overestimated while the production from the second well will be underestimated. To properly value the gas and liquid production from both wells, a method of more accurately determining the mass flow rate of both the gas and liquid phases is required.

The prior art, however, has been generally incapable of accurately metering the very high void multi-phase fluid streams. In light of the problems of the prior art, there is a need for an apparatus and method that is less complex and provides increased accuracy for very high void multi-phase fluid streams. Such an apparatus and method should be physically rugged, simple to use, and less expensive than current technology.

SUMMARY OF THE INVENTION

It is an object of the present invention to provide an improved apparatus and method for metering very high void multi-phase fluid streams.

It is another object of the present invention to provide an apparatus and method which increases the accuracy of metering with respect to both the gas phase and the liquid phase when measuring very high void multi-phase fluid streams.

It is still another object of the present invention to provide such an apparatus and method which does not require homogenization or separation of the multi-phase fluid in order to determine flow rate for each of the phases.

The above and other objects of the invention are realized in a specific method for metering the phases of a multiple phase fluid. The flow meter includes a cross-sectional area change in the flow conduit such as a venturi with an elongate passage. Disposed along the elongate passage is a converging section, an extended throat section, and a diffuser. The flow meter also includes a plurality of pressure monitoring sites which are used to monitor pressure changes which occur as the multi-phase fluid passes through the elongate passage. These pressure changes, in turn, can be processed to provide information as to the respective flow rates of the phases of the multi-phase fluid. By determining the flow rates of the components of the multi-phase fluid, the amount of natural gas, etc., can be accurately determined and accounting improved.

In accordance with another aspect of the present invention a method for determining the mass flow of the high void fraction fluid flow and the gas flow includes a number of steps. The first step is calculating a gas density for the gas flow. The next two steps are finding the normalized gas mass flow rate through the venturi and then computing the actual gas mass flow rate. The following step is estimating the gas velocity in the venturi tube throat. The next step is calculating the additional pressure drop experienced by the gas phase due to work performed by the gas phase in accelerating the liquid phase between the upstream pressure measuring point and the pressure measuring point at the end of the venturi contraction or throat. Yet another step is estimating the liquid velocity in the venturi throat using the calculated pressure drop experienced by the gas-phase due to work performed by the gas phase. Then, the friction loss is computed between the liquid phase and the conduit wall in the venturi tube using the liquid velocity. Finally, the total mass flow rate based on measured pressure in the venturi throat is calculated, and the liquid mass flow rate is calculated by subtracting the total mass flow rate and the gas mass flow rate.

BRIEF DESCRIPTION OF THE DRAWINGS

The above and other objects, features and advantages of the invention will become apparent from a consideration of the following detailed description presented in connection with the accompanying drawings in which.

DETAILED DESCRIPTION OF THE INVENTION

Reference will now be made to the drawings in which the various elements of the present invention will be given numeral designations and in which the invention will be discussed so as to enable one skilled in the art to make and use the invention. It is to be understood that the following description is only exemplary of the principles of the present invention, and should not be viewed as narrowing the pending claims.

Figure 1:
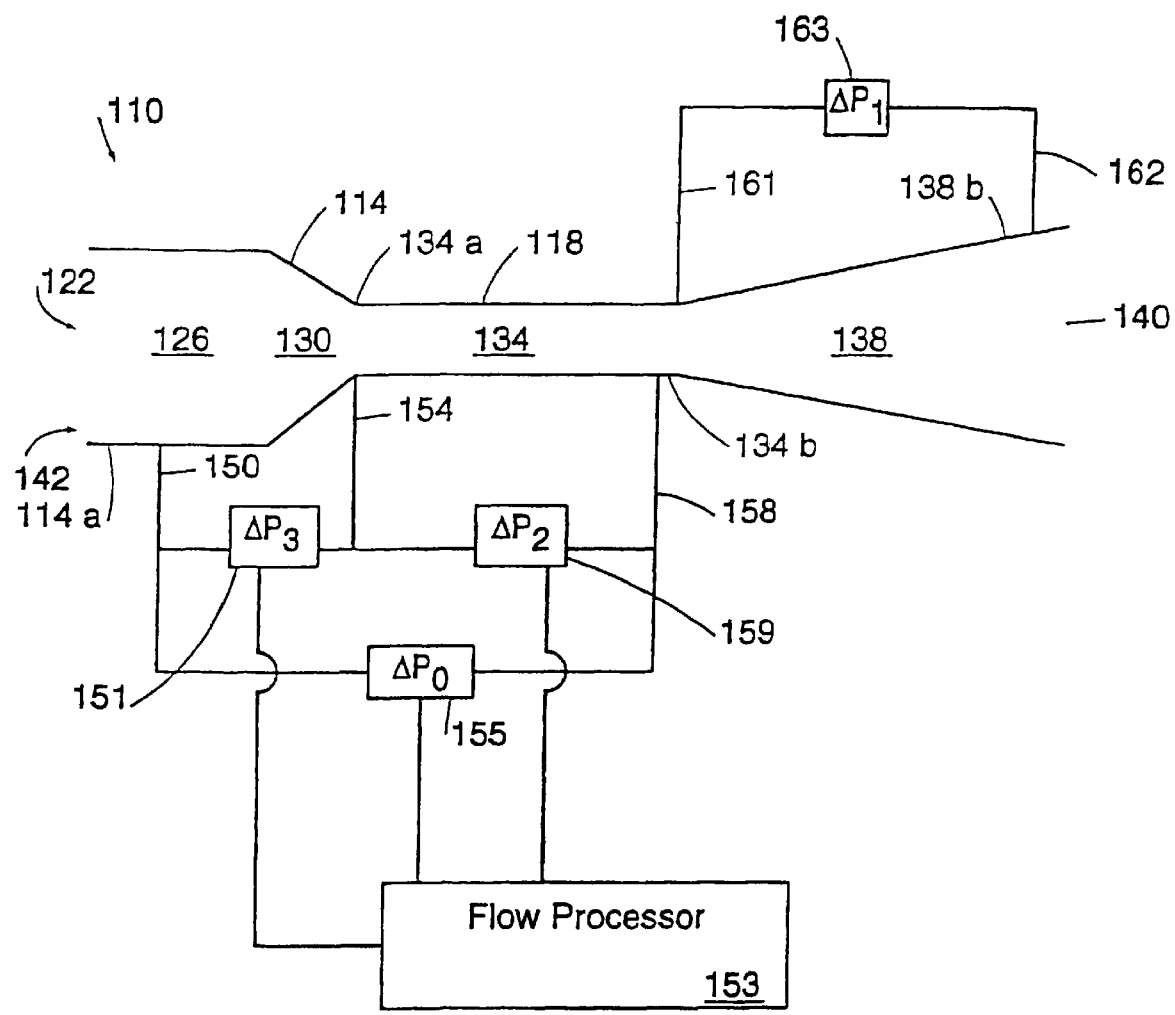
FIG. 1 shows a side, cross-sectional view of a differential pressure flow meter with pressure measuring ports.

Turning now to FIG. 1, there is shown another differential pressure flow meter, generally indicated at 110. The differential pressure flow meter 110 includes a venturi 114 formed by a sidewall 118 which defines a fluid flow passage 122. The fluid flow passage 122 is segmented into an inlet section 126, a converging section 130, an extended throat section 134, a diffuser section 138 and an outlet section 140.

The geometry and conduit diameter of the flow obstruction will vary depending on the particular application. The conduit may be larger or smaller depending on the specific flow rate, pressure, temperature and other similar factors. One important characteristic of the flow meter is that the preferred contraction ratio in the conduit should be between 0.4 and 0.75. The contraction ratio is defined as the ratio of the throat diameter 134 to the upstream conduit diameter 122. It is also important that the length of the throat is at least ten times the diameter of the throat. Of course, other throat lengths may be used.

An example of one possible set of conduit measurements will now be given, but it should be realized that the actual geometry will depend on the volume and size of the specific application. In one embodiment of the invention, the inlet section 126 has a diameter of about 3.8 cm adjacent the opening 142 at the upstream, proximal end 114a of the venturi 114. The converging section 130 tapers inwardly from the inlet section 126 at an angle of about ten degrees (10°) until it connects with the extended throat section 134, which has a diameter of about 2.5 cm. The extended throat section 134 remains substantially the same diameter throughout its length and may be about 30 cm long to provide ample length to determine acceleration differences between the various phases. At the end of the extended throat section 134*b*, the diffuser section 138 tapers outwardly at an angle of about three degrees (3°) until the diameter of the outlet section passage 140 is substantially the same as that at the inlet section 126 (i.e. 3 cm). It should be realized that many other specific geometric configurations could be defined which have characteristics similar to the example above.

In order to monitor the pressure differentials caused by the changes in fluid velocity, the differential pressure flow meter shown in FIG. 1 utilizes up to four different measurement points. Each pair of pressure measurement points defines a pressure differential. Only two pressure differential measurements are required to determine the gas and liquid flow rates. The preferred pressure differentials are $\Delta P_3$ and $\Delta P_2$. Pressure differential number three ($\Delta P_3$) is defined as the pressure change between points 150 and 154. Pressure differential number two ($\Delta P_2$) is between points 154 and 158. It should also be apparent based on this disclosure, that pressure differentials $\Delta P_3$ and $\Delta P_0$ or $\Delta P_2$ and $\Delta P_0$ may be used instead. Each of these combinations work equally well, with the exception that the numerical constants in the algorithm change. It is also important that an absolute pressure and temperature measurement will be provided at the venturi inlet 142.

Now the pressure ports will be described more specifically. A first pressure measuring port 150 is disposed to measure the pressure in the inlet section 142. The first pressure measuring port 150 is connected to a pressure monitoring means, such as a pressure transducer 151, to provide a pressure reading.

A second pressure measuring port 154 is provided at the entrance of the extended throat section 134. The second pressure measuring port 154 is disposed adjacent the upstream, proximal end 134*a* of the extended throat section 134. A pressure transducer 151 is also coupled to the second pressure measuring port 154.

Distally from the second pressure measuring port 154, but still within the extended throat section 134, is a third pressure monitoring port 158. Preferably, the third pressure monitoring port 158 is disposed adjacent the distal end 134*b* of the extended throat section 134, and adjacent the beginning 138*a* of the diffuser section 138.

The respective pressure measuring ports 150, 154, and 158 are disposed in communication with a flow processor 153 or similar mechanism through the pressure monitoring means or pressure transducers 151, 155, and 159. The flow processor 153 enables the acquisition of the measured pressure differentials, and thus fluid flow rates in accordance with the present invention. Further, an accurate determination of the relative acceleration of the two phases can also be obtained by comparing the pressure drop between the inlet section 126 (through measuring port 150) and the distal end 134*b* of the extended throat section 134 (through measuring port 158), as indicated at $\Delta P_0$.

In an alternative embodiment of the invention, a fourth pressure measuring port 161 is disposed at the end of the extended throat 134*b*. A fifth pressure measuring port 162 is disposed in the outlet section 140 adjacent to the distal end 138*b* of the diffuser section 138. Both of these pressure measuring ports are coupled to pressure monitoring means or pressure transducer 163. The fourth and fifth monitoring ports allow a pressure differential $\Delta P_1$ to be measured. The pressure differential ($\Delta P_1$) between the extended throat section 134 and the distal end 138*b* of the diffuser section 138 can also be analyzed.

It should also be realized that different angles and lengths can be used for the venturi constriction and the extended throat of the venturi tube. In fact, the converging section of the venturi is not required to gradually taper. Rather the converging section can be formed by an annular shoulder to reduce the cross-sectional area of the inlet section. The preferred size of the radius of curvature for an annular shoulder is about 0.652 cm. The converging section can also be formed by placing a solid object in the conduit which occupies part but not all of the conduit cross-section.

It is vital that the correct method be used in the current invention to estimate the gas and fluid mass flow. Otherwise errors in the range of 20% or more will be introduced into the measurements, as in the prior art. Reliable metering of high void fraction multi-phase flows over a wide range of conditions (liquid loading, pressure, temperature, and gas and liquid composition) without prior knowledge of the liquid and gas mass flow rates requires a different approach than the simple modification of the single phase meter readings as done in the prior art. Conceptually, the method of metering a fluid flow described here is to impose an acceleration or pressure drop on the flow field via a structure or venturi constriction and then observe the pressure response of the device across two pressure differentials as described above. Because the multi-phase pressure response differs significantly from that of a single-phase fluid, the measured pressure differentials are a unique function of the mass flow rates of each phase.

As described above, the gas and liquid phases are strongly coupled. When the gas phase accelerates in the converging section of the nozzle, the denser liquid phase velocity appreciably lags that of the lighter gas phase. In the extended throat region, the liquid phase continues to accelerate, ultimately approaching its equilibrium velocity with respect to the gas phase. Even at equilibrium, significant velocity differences or slip will exist between the gas and liquid phases.

A method for accurately calculating the gas and liquid mass flows in an extended venturi tube will now be described. (A derivation of the method is shown later.) This method uses the four values which are determined though testing. These values are: $\Delta P_3$ which is the measured pressure differential across the venturi contraction, $\Delta P_2$ which is the measured pressure differential across the extended venturi throat, P which is the absolute pressure upstream from the venturi (psi), and T which is the temperature of the upstream flow. These measured values are used with a number of predefined constants which will be defined as they are used. Alternatively, the pressure differentials $\Delta P_3$ and $\Delta P_0$, or the pressure differentials $\Delta P_0$ and $\Delta P_2$ may be used.

First, the gas density for the gas flow must be calculated based on the current gas well pressure and temperature. This is done using the following equation which uses English units. Any other consistent set of units may also be used with appropriate modifications to the equations.

$$rho_{gw} = rho_g \left( \frac{P + 14.7}{14.7} \right) \left( \frac{60 + 459.67}{T + 459.67} \right) \qquad \text{Equation 1}$$

where $rho_g$ is the density of natural gas (i.e. a mixture methane and other hydrocarbon and non-hydrocarbon gases) at standard temperature (60° F.) and pressure (1 atmosphere) for a specific well;

P is the pressure upstream from the venturi in pounds per square inch (psi); and T is the temperature upstream from the venturi in degrees Fahrenheit.

The value of $rho_g$ will be different for various natural gas compositions and must be supplied by the well operator. At the standard temperature (60° F.) and pressure (1 atmosphere) the value of $rho_g$ for pure methane is 0.044 lb/ft³.

The second step is finding a normalized gas mass flow rate based on the square root of a pressure difference across the contraction multiplied by a first predetermined coefficient, and the square root of a measured pressure differential across a venturi throat. The normalized gas mass flow rate is found using the following equation:

$$mgm = A + B\sqrt{\Delta P_3} + C\sqrt{\Delta P_2} \qquad \text{Equation 2}$$

where

A, B, and C are experimentally determined constants required to calculate gas mass flow rate;

$\Delta P_3$ is the measured pressure differential across a venturi contraction; and $\Delta P_2$ is the measured pressure differential across a venturi throat. The preferred values for the constants in the equation above are as follows: A is −0.0018104, B is 0.008104 and C is −0.0026832 when pressure is in pounds per square inch (psi), density in lbs/ft³ and mass flow rate in thousands of mass lbs/minute. Of course, these numbers are determined experimentally and may change depending on the geometry of the venturi, the fluids used, and the system of units used.

Calculating the normalized gas mass flow rate is important because it allows the meter to be applied to the wells or situations where the pressure or meter diameter for the liquids present are different than the conditions under which the meter was originally calibrated. This means that the meter does not need to be calibrated under conditions identical to those present in a particular application and that the meter may be sized to match the production rate from a particular well.

The functional form of Equation 2 is arrived at by derivation from the conservation of mass and energy followed by a simplifying approximation. Other functional forms of Equation 2 can be used with equivalent results. The functional form of Equation 2 is consistent with the conservation laws and provides a good representation of the calibration data.

The third step is computing a gas mass flow rate using the normalized gas mass flow rate, the gas density, and a contraction ratio of the venturi tube. The equation for calculating the gas mass flow rate from these quantities is $$mg = mgm \cdot A_t \cdot \frac{\sqrt{rho_{gw}}}{\sqrt{1-\beta^4}} \qquad \text{Equation 3}$$

where mgm is the normalized gas mass flow rate;

$A_t$ is the venturi throat area;

$\beta$ is the contraction ratio of the throat area; and $rho_{gw}$ is the gas density at current well conditions.

The fourth step is estimating the gas velocity in the venturi tube throat. The equation for estimating the gas velocity is:

$$u_g = \frac{m_g}{rho_g \cdot A_t} \qquad \text{Equation 4}$$

where $m_g$ is the gas mass flow rate;

$rho_g$ is the density of the gas phase for a specific well; and $A_t$ is the venturi throat area.

The fifth step is calculating the pressure drop experienced by the gas phase due to work performed by the gas phase in accelerating the liquid phase between an upstream pressure measuring point and a pressure measuring point in the distal end of the venturi throat. The pressure drop is calculated as follows:

$$\Delta P_{gl3} = \Delta P_3 - \frac{1}{2} \cdot rho_{gw} \cdot u_g^2 \cdot (1-\beta^4) \qquad \text{Equation 5}$$

where $\Delta P_3$ is the measured pressure differential across a venturi contraction;

$rho_{gw}$ is gas density at well conditions;

$u_g$ is the gas velocity in the venturi throat; and $\beta$ is the contraction ratio of the throat area to the upstream area.

It is important to note that the calculations outlined in steps two and five are important because they allow for estimating the mass flow of each phase.

Step six is estimating the liquid velocity ($u_l$) in the venturi throat using the calculated pressure drop experienced by the gas phase due to work performed by the gas phase. This is performed as follows $$u_l = \sqrt{\frac{2(\Delta P_3 - \Delta P_{gl3})}{rho_l \cdot [(1+\beta^4) + gcfw]}} \qquad \text{Equation 6}$$

where $\Delta P_3$ is the measured pressure differential across a venturi contraction;

$\Delta P_{gl3}$ is the pressure drop experienced by the gas-phase due to work performed by the gas phase on the liquid phase;

$rho_l$ is the liquid density; and gcfw is a constant which characterizes wall friction. The preferred value for gcfw is defined as 0.062. This value may be adjusted depending on different venturi geometries or different fluids.

The seventh step is computing the friction between the liquid phase and a wall in the venturi which is performed:

$$f = gcfw \cdot \frac{1}{2} \cdot rho_l \cdot u_l^2 \qquad \text{Equation 7}$$

where gcfw is a constant which characterizes wall friction;

$rho_l$ is the liquid density; and $u_l$ is the liquid velocity in the venturi throat.

The eighth step is calculating the total mass flow rate based on the measured pressure in the venturi throat, the calculated friction and the gas velocity. The equation for this is:

$$m_t = \frac{2(\Delta P_3 - f)}{(1-\beta^4) \cdot u_g} \cdot A_t \qquad \text{Equation 8}$$

where $\Delta P_3$ is the measured pressure differential across a venturi contraction;

$\beta$ is the contraction ratio of the throat diameter to the upstream diameter; and $u_g$ is the gas velocity in the venturi throat.

The liquid mass flow rate can now be calculated as the difference between the total and gas mass flow rates.

$$m_l = (m_{t-mg}) \qquad \text{Equations 9}$$

wherein $m_t$ is the total mass flow rate; and $m_g$ is the gas mass flow rate.

Calculating the gas mass flow rate, total mass flow rate, and liquid mass flow rate using the method outlined above is much more accurate than the prior art. The accuracy of method outlined above is within ±4% for the gas phase, ±5% for the liquid phase, and ±4% for the total mass flow. This accuracy can even be increased using measured calibrations for a specific installation to benchmark the readings.

Figure 2:
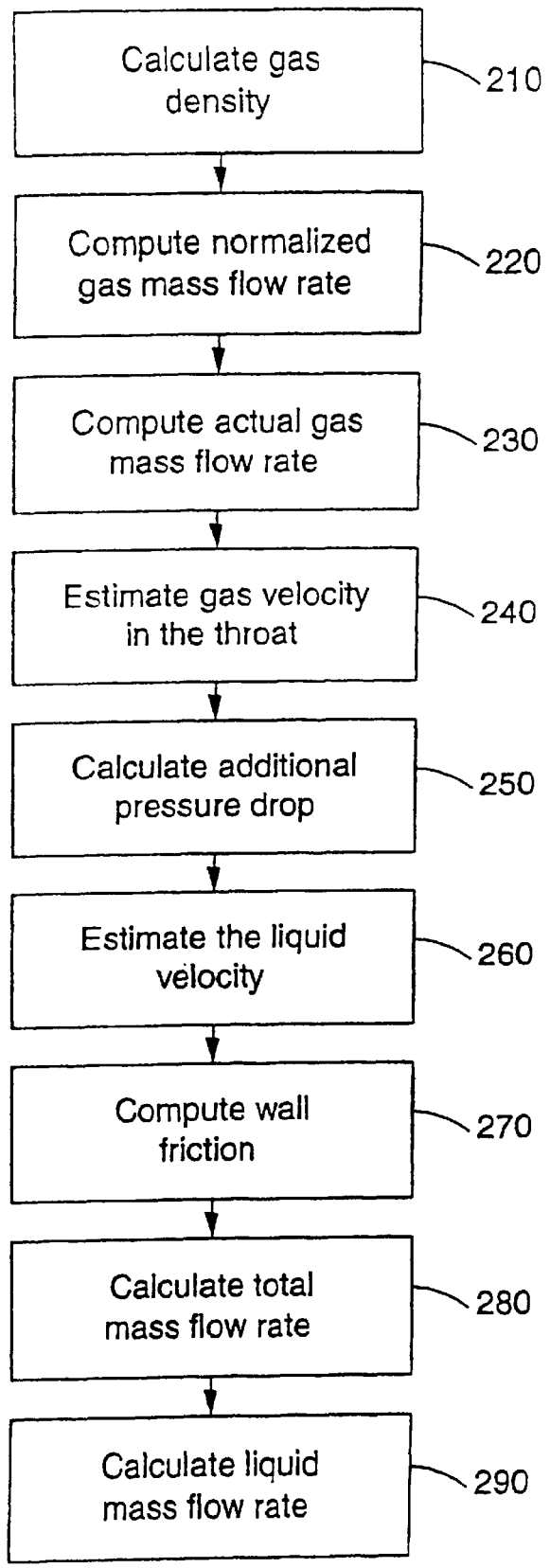
FIG. 2 is a flow chart showing the steps required to calculate the mass flow in a multiphase flow.

FIG. 2 shows a summary of the method used to accurately calculate the mass flow through the elongated venturi. The method for determining the mass flow of the high void fraction fluid flow and the gas flow includes steps which were described with Equations 1–9. Referring to FIG. 2, the first step is calculating a gas density for the gas flow 210. The next two steps are finding a normalized gas mass flow rate through the venturi 220 and computing a gas mass flow rate 230. The following step is estimating the gas velocity in the venturi tube throat 240. The next step is calculating the pressure drop experienced by the gas-phase due to work performed by the gas phase in accelerating the liquid phase between the upstream pressure measuring point and the pressure measuring point in the venturi throat 250. Yet another step is estimating the liquid velocity 260 in the venturi throat using the calculated pressure drop experienced by the gas-phase due to work performed by the gas phase. Then the friction is computed 270 between the liquid phase and a wall in the venturi tube. Finally, the total mass flow rate based on measured pressure in the venturi throat is calculated 280 and the liquid mass flow rate is determined 290.

Figure 3:
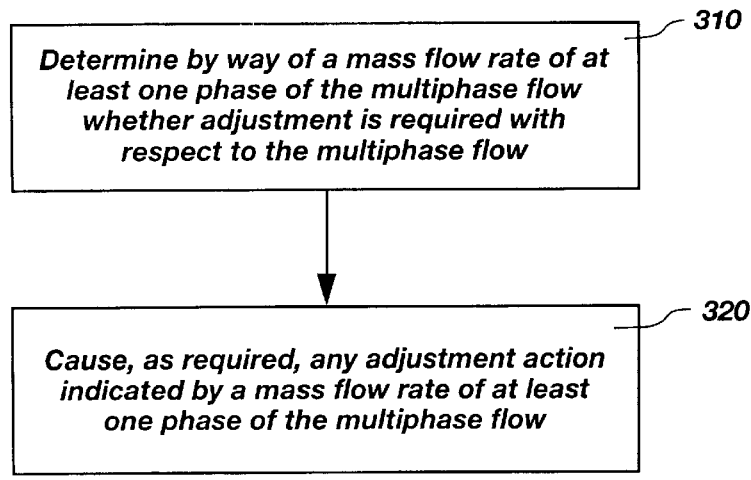
FIGS. 3–7 illustrate further operating steps according to the present invention.
Figure 4:
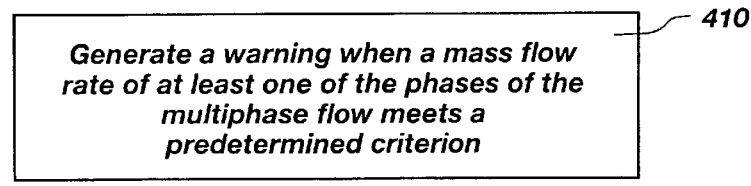
Figure 5:
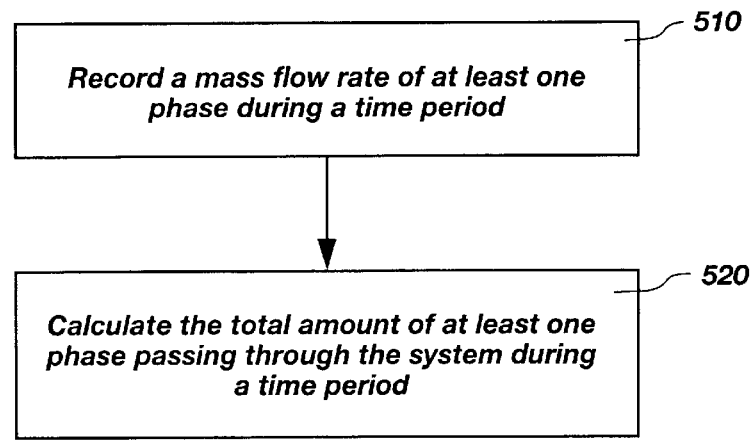
Figure 6:
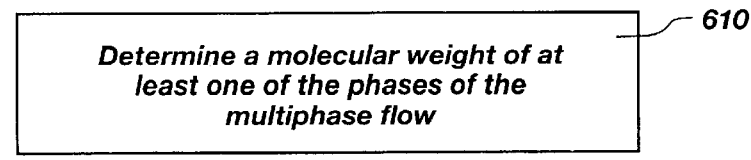

Additional aspects of the present invention may enhance the method or portions of the method as outlined in FIG. 2. For instance, adjustments may be performed based on a measurement of a mass flow rate of a multiphase flow. FIG. 3 shows a block diagram of such a configuration where a mass flow rate measurement is used to determine whether adjustment is required with respect to the multiphase flow 310, and causing, as required, any adjustment action indicated by a mass flow rate of at least one phase of the multiphase flow 320. Of course, a warning may be generated based on a mass flow rate of a phase within the multiphase flow as shown in FIG. 4 in 410. Further, as shown in FIG. 5, it is contemplated by the present invention that the mass flow rate of one or more phases in a multiphase flow may be recorded over a time period 510 as well as summed over a time period to generate the total amount of a phase passing through the system 520. In addition, as shown in FIG. 6, a molecular weight of at least one of the phases of the multiphase flow may be determined 610.

Figure 7:
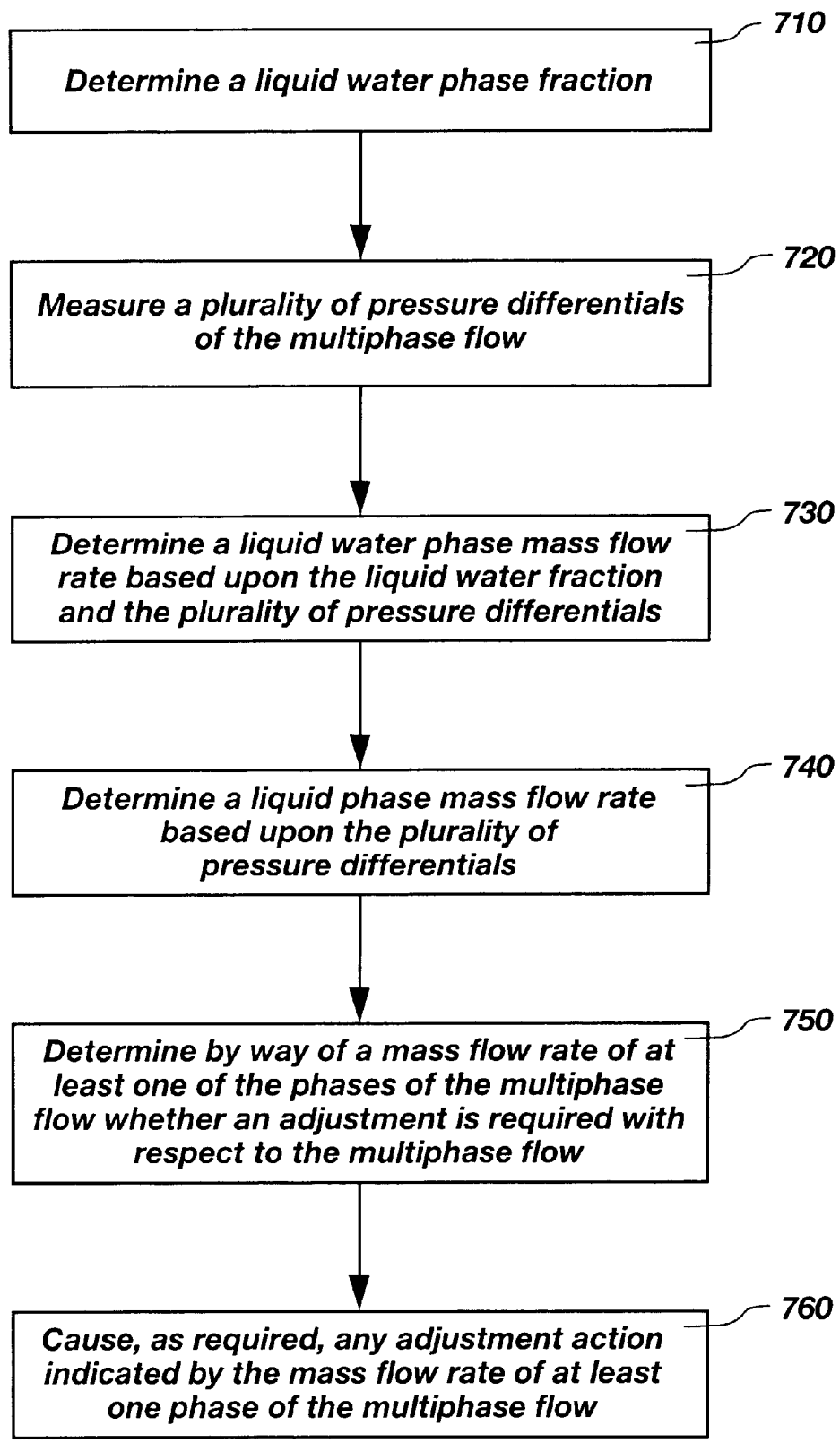

The present invention may also be used with a multiphase flow that includes a liquid water fraction as well as another liquid phase, such as an oil producing operation, as shown in FIG. 7. FIG. 7 shows a method of the present invention including determining a liquid water fraction 710, measuring a plurality of pressure differentials of the multiphase flow 720, determining a liquid water phase mass flow rate based upon said liquid water fraction and said plurality of pressure differentials 730, determining a liquid phase mass flow rate based upon said plurality of presssure differentials 740, determining by way of a mass flow rate of at least one of the phases of the multiphase flow whether adjustment is required with respect to the multiphase flow 750, and causing, as required, any adjustment action indicated by the mass flow rate of at least one phase of the multiphase flow 760.

Figure 8:
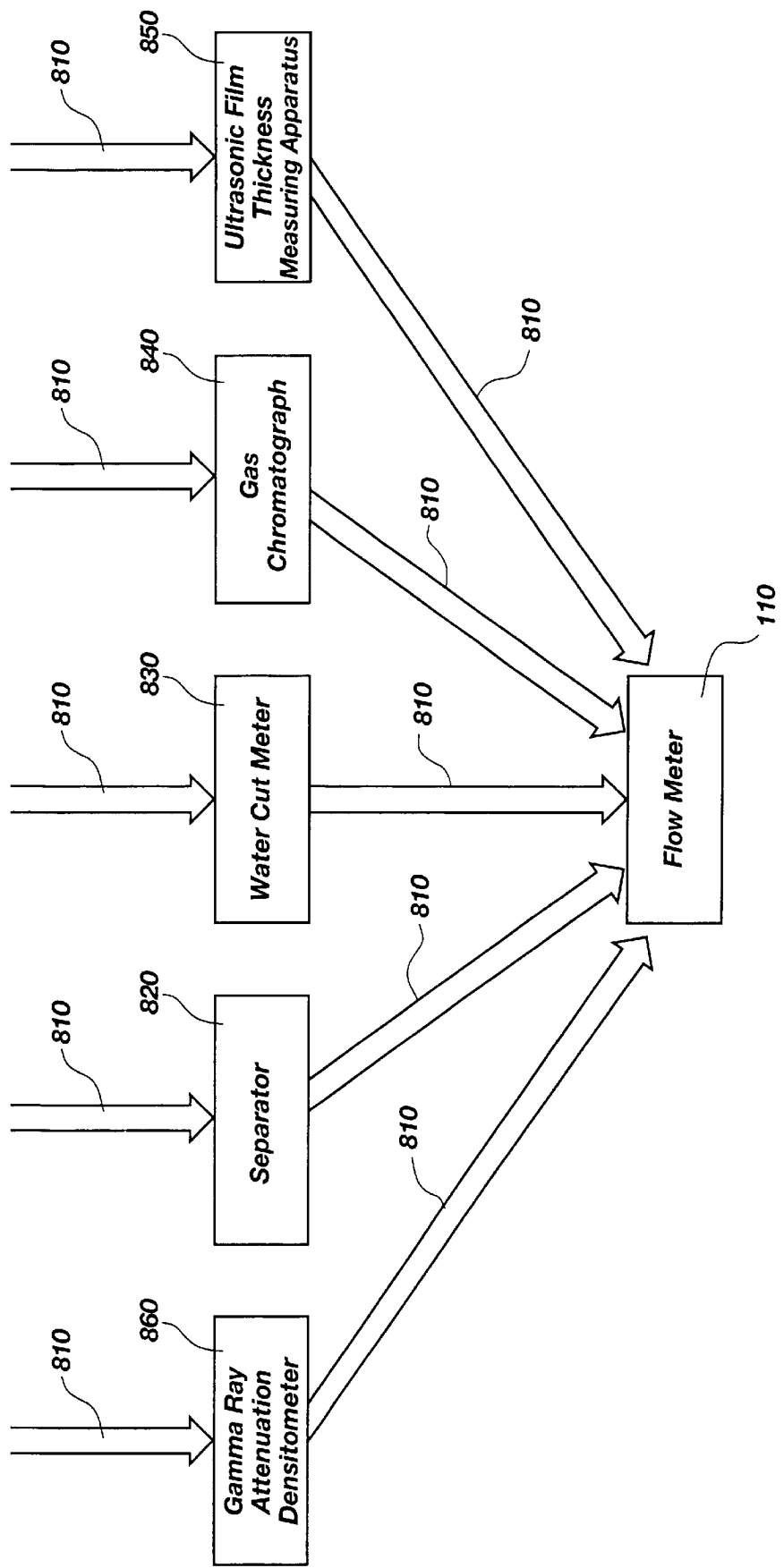
FIG. 8 schematically depicts additional equipment having utility for measuring or processing multiphase flow according to the present invention.

Other aspects of the present invention may include addition equipment for measuring or processing the multiphase flow. For instance as shown in FIG. 8, a water cut meter 820, a separator 830, and/or a gas chromatograph 840 may be utilized as part of the present invention. FIG. 8 shows a multiphase flow 810 passing through one or more of a water cut meter 820, a separator 830, and/or a gas chromatograph 840 as well as the flow meter 110 show in FIG. 1. Further, a gamma ray attenuation densitometer 860 or ultrasonic thickness measuring apparatus 850 may be used in conjunction with the flow meter 110 as shown in FIG 8. Of course, FIG. 8 is merely illustrative, and the water cut meter 820, a separator 830, and/or a gas chromatograph 840, ultrasonic thickness measuring apparatus 850, and gamma ray attenuation densitometer 860 may be configured in serial or parallel arrangements and may be placed prior to or subsequent to the flow meter 110 in relation to the direction of the multiphase flow 810.

Theoretical Gas Mass Flow Rate

Now a discussion of the theoretical derivations will be outlined which produced the method described above. The theoretical derivation is based on the physical laws describing the conservation of mass and energy for both the gas and liquid phases. The conservation of mass and energy equations for each phase are shown below where the subscript 1 denotes the upstream condition measured at 142 by pressure tap 150 in FIG. 1, and the subscript 2 denotes the venturi throat entrance measured at 134a by pressure tap 154. $\Delta P_{gl3}$ is the pressure drop experienced by the gas phase due to work done by the gas phase in accelerating the liquid phase between the pressure measuring location at the beginning of the elongated throat and the pressure measuring location at the end of the throat. It is assumed that only the liquid phase is in contact with the wall, $f_w$ is the wall friction coefficient and $G_c$ is a geometry factor which accounts for the acceleration of the fluid in the venturi contraction and the surface area of the contraction.

$$m_g = \alpha_1 \rho_{g1} u_{g1} A_1 = \alpha_2 \rho_g u_{g2} A_2$$

$$m_l = (1-\alpha_1)\rho_l u_{l1} A_1 = (1-\alpha_2)\rho_l u_{l2} A_2 \qquad \text{Equations 10}$$

$$P_1 + \frac{1}{2}\rho_g u_{g1}^2 = P_2 + \frac{1}{2}\rho_g u_{g2}^2 + \Delta P_{gl3}$$

$$P_1 + \frac{1}{2}\rho_l u_{l1}^2 = P_2 + \frac{1}{2}\rho_l u_{l2}^2 - \Delta P_{gl3} + G_c f_w \frac{1}{2}\rho_l u_{l2}^2$$

In Equations 10, $\alpha$ is void fraction, $\rho_g$ is density of a gas at standard temperature, $u_g$ is the gas velocity, $A_1$ is the conduit area upstream of the venturi, $A_2$ is the conduit area in the venturi throat, and $P_1$ and $P_2$ are the pressures at locations 142 (tap 150) and 134*a* (tap 154) in the conduit.

The gas phase energy equation can be rewritten using the equation for the gas phase mass flow rate, where D is the diameter of the upstream piping, d is the throat diameter, $\beta=d/D$ is the contraction ratio, and $\Delta P_3=P_2-P_1$ is the pressure drop across the contraction.

$$\Delta P_3 = \frac{1}{2}\frac{m_g^2}{\rho_g \alpha_2^2 A_2^2}\left(1-\left(\frac{\alpha_2}{\alpha_1}\right)^2 \beta^4\right)+\Delta P_{g/3} \qquad \text{Equation 11}$$

With the approximation that $\alpha_1$ and $\alpha_2 \cong 1$, the modified orifice equation results.

$$\Delta P_3 \approx \frac{1}{2}\frac{m_g^2}{\rho_g A^2}(1-\beta^4)+\Delta P_{g/3} \qquad \text{Equation 12}$$

For single-phase flow $\Delta P_{g/3}$ is equal to zero and the equation is solved directly for the mass flow rate $m_g$. In practice, the single-phase result is modified by the addition of an empirical constant $C_c$ which accounts for the true discharge characteristics (non-ideal one-dimensional behavior and friction losses) of the nozzle and Y which takes compressibility effects into account.

$$m_{g1\phi} = \frac{C_c A Y}{\sqrt{1-\beta^4}}\sqrt{2\rho_g \Delta P_3} \qquad \text{Equation 13}$$

As shown in the introduction, if the Equation 13 above is used under multiphase conditions, the mass flow rate of the gas phase can be significantly overestimated. Under multiphase conditions the mass flow rate of the gas phase is given by:

$$m_g = \frac{C_{2\phi}\alpha_2 A_2 Y}{\sqrt{1-\left(\frac{\alpha_2}{\alpha_1}\right)^2 \beta^4}}\sqrt{2\rho_g(\Delta P_3-\Delta P_{g/3})} \qquad \text{Equation 14}$$

where $\alpha_2 A_2$ represents the cross sectional area occupied by the gas phase. When $\Delta P_3$ is large with respect to $\Delta P_{g/3}$ the quantity under the radical can be approximated by $$\sqrt{\Delta P_3 - \Delta P_{g/3}} \approx \sqrt{\Delta P_3} - C_{g/3} \times \sqrt{\Delta P_{g/3}} \qquad \text{Equation 15}$$

where $C_{g/3}$ is a constant that is determined experimentally. Empirically it has been found that $\Delta P_{g/3}$ can be replaced by a function of $\Delta P_2$, the pressure drop in the extended throat, with appropriate choice of constants. The mass flow rate of gas under both single phase and multiphase conditions now becomes $$m_g \frac{C_{2\phi} A Y}{\sqrt{1-\beta^4}}\sqrt{2\rho_g}\left[\sqrt{\Delta P_3}-C_2 \times \sqrt{P_2}\right] \qquad \text{Equation 16}$$

where it has been assumed that $\alpha_2 \approx \alpha_1 \approx 1$. The constants $C_{2\phi}$ and $C_2$ have been determined empirically and the validity of the equation has been tested over a wide range of conditions. It is important to note that this method can be used not only with natural gas production but other gas and liquid phase compositions. In addition, it is also important to recognize that Equations 10–16 are used to derive calculation steps in the calculation method.

We have assumed that $\alpha_2 \approx \alpha_1 \approx 1$, making Equation 16 above only approximate. The statistical fitting procedure used to determine the constants $C_{2\phi}$ and $C_2$ implicitly determines a weighted mean value of $\alpha$. Because $\alpha$ does not appear explicitly and is unknown, there is an uncertainty of $\pm 1-2\%$ over the void fraction range $0.95<\alpha<1.0$, implicit in the equation. If $\alpha$ or $(1-\alpha)$ is independently measured, the observed measurement uncertainties can be significantly reduced. The uncertainty can also be significantly reduced if, at installation, the actual flow rates are accurately known. If this measurement is available then the meter reading can be adjusted to reflect the true value and the uncertainty in the gas phase mass flow rate measurement can be reduced to less than 0.5% of reading if the gas and liquid flow rates change by less than 50% or so over time. The repeatability of the measurement is essentially the random uncertainty in the pressure measurements, less than about 0.5% of reading.

Total and Liquid Mass Flow Rate

If the ratio of liquid to gas flow rate is known *a priori* with certainty then the mass flow rate of the liquid phase can be directly obtained from $m_l = m_g (m_l/m_g)_{known}$. Note that because the liquid mass flow rate is only a fraction (0–30%) of the gas mass flow rate the uncertainty in the measurement is magnified. For instance, if $m_l/m_g=0.01$, a 1% error in $m_g$ is magnified to become a 100% of reading error for the liquid phase. An additional fixed error of 1% in the ratio $m_l/m_g$ results in a 200% of reading total error for the liquid phase. This approach, of course, assumes that the $m_l/m_g$ ratio remains constant over time.

Unfortunately, without accurate independent knowledge of $\alpha$ or $(1-\alpha)$ the liquid mass flow rate cannot be obtained directly from one-dimensional theory. The velocity of the liquid phase can, however, be estimated directly as now described. Once the mass flow rate of the gas phase is determined the $\Delta P_{g/3}$ term can be estimated from the gas phase energy equation:

$$\Delta P_{g/3} \approx \Delta P_3 - \frac{1}{2}\frac{m_g^2}{\rho_g A^2}(1-\beta^4) \qquad \text{Equation 17}$$

Equation 17 allows us to derive Equation 5 in the calculation method. Rearranging the liquid phase energy equation yields $$\Delta P_3 + \Delta P_{g/3} = \frac{1}{2}\rho_l u_l^2\left(1-\frac{u_{l1}^2}{u_{l2}^2}\right)+G_c f_w \frac{1}{2}\rho_l u_{l2}^2 \qquad \text{Equation 18}$$

and using the expression for the mass flow rate of liquid results in:

$$\Delta P_3 + \Delta P_{g/3} = \qquad \text{Equation 19}$$
$$\frac{1}{2}\rho_l u_{l2}^2\left(1-\frac{(1-\alpha_2)^2}{(1-\alpha_1)^2}\beta^4\right)+G_c f_w \frac{1}{2}\rho_l u_{l1}^2$$

With the assumption that $$\frac{(1-\alpha_2)^2}{(1-\alpha_1)^2}\beta^4 \ll 1$$

the liquid velocity $u_{l2}$ can be estimated. If $(1-\alpha)$ is known then the liquid mass flow rate could be estimated directly from $m_l=(1-\alpha_2)\rho u_{l2}A$. Unfortunately, $(1-\alpha)$ cannot be accurately estimated directly from the differential pressure data; it must be independently measured to pursue this approach.

If we consider the gas and liquid phases together but allow their velocities to differ, the total mass flow rate can be written as:

$$m_t = m_g + m_l = \left(\alpha\rho_2 + \frac{(1-\alpha)}{S}\rho_l\right)u_g A \quad \text{Equation 20}$$

where the density term in brackets is the effective density, $\rho_{slip}$, and $S=u_g/u_l$ which is ratio of the gas velocity to the liquid velocity or slip. Since $m_t$ is constant throughout the venturi, it allows us to write the pressure drop $\Delta P_3$ as $$\Delta P_3 = \frac{1}{2}\left(\alpha\rho_g + \frac{(1-\alpha)}{S}\rho_l\right)u_g^2(1-\beta^4) + G_c f_w \frac{1}{2}\rho_l u_{l2}^2 \quad \text{Equation 21}$$

The second term on the right hand side is the friction loss assuming that only the liquid phase is in contact with the wall. The equation can be rearranged to yield the total mass flow rate $$m_t = \left(\alpha\rho_g + \frac{(1-a)}{S}\rho_l\right)u_g A \quad \text{Equation 22}$$

$$= \frac{2\left(\Delta P_3 - G_c f_w \frac{1}{2}\rho_l u_{l2}^2\right)A}{(1-\beta^4)\cdot u_g}$$

The total mass flow rate mt can then be obtained directly from $\Delta P_3$ once $u_g$ is estimated from the measured value of $m_g$, $u_g=m_g/\rho_g A$ and the liquid velocity is calculated by solving equation 19 for $u_{l2}$. The total mass flow rate using this method is a measurement with an uncertainty of ±4% of the actual measured flow. In principle, (since the total mass flow rate is the sum of the gas and liquid mass flow rates) the liquid mass flow rate can now be obtained directly from $m_l$32 $m_t-m_g$. The liquid mass flow rate can then be obtained within ±5% of the total mass flow rate.

As previously noted in the discussion of the measurement of the gas mass flow rate, if the flow rates of each phase are accurately known at the time of installation, measurement performance over a reasonable range of mass flow rates can be significantly enhanced. The uncertainty in the gas mass flow rate measurement can be reduced to <0.5% of reading by benchmarking even if the gas and/or liquid mass flow rates change by ±50%. Similarly, the uncertainty in the total mass flow rate can be reduced by <2% of reading for the same ±50% changes in gas and/or liquid mass flow rates. The corresponding improvement in accuracy of the liquid phase measurement is also significant. Because the liquid mass flow rate measurement is dependent on both the gas phase and total mass flow rate measurements, the uncertainty is also sensitive to changes in both gas and liquid mass flow rate. If the liquid mass flow rate measurement is benchmarked at an initial value, the data indicate that the accuracy attainable is ±20% of reading for changes in gas mass flow rate in the range of $\leq\pm15\%$ and/or changes in liquid mass flow rate in the range of $\leq\pm25\%$. The uncertainty in the liquid mass flow rate quoted in terms of percent of total mass flow rate becomes ±1%.

Measurement uncertainties can be significantly reduced if flow rates are accurately known at time of meter installation or periodically measured by separation and separate metering during the service life of the meter and the well. Because the liquid phase is generally only a small fraction of the total mass flow rate the uncertainty in its measurement is inherently high. If the void fraction $\alpha$ is accurately and independently measured, the liquid mass flow rate can be calculated directly from $m_l=(1-\alpha)l_l u_{l2}A$ where the $u_{l2}$ the liquid velocity is obtained as described above from equation 19. The void fraction may be accurately and independently measured using a gamma ray attenuation densitometer or through ultrasonic film thickness measurements. This approach has been shown to significantly reduce the uncertainty in the liquid mass flow rate measurement.

I claim:

1. In an oil field having at least one well for facilitating control of a multiphase flow having a gas phase and a liquid phase, a method for managing operation of the at least one well, the method comprising:
    measuring at least two pressure differentials of the multiphase flow;
    determining a mass flow rate of at least one of the phases of the multiphase flow based upon said at least two pressure differentials;
    using said mass flow rate of at least one phase of the multiphase flow to determine whether adjustment is required with respect to the multiphase flow; and
    causing, as required, the at least one well to implement any adjustment indicated by said mass flow rate of at least one phase of the multiphase flow.

2. The method as recited in claim 1, wherein using said mass flow rate of at least one phase of the multiphase flow to determine whether adjustment is required with respect to the multiphase flow comprises:
    correlating said adjustment with at least one predetermined criterion; and
    comparing said mass flow rate of at least one of the phases of the multiphase flow to said at least one predetermined criterion.

3. The method as recited in claim 1, wherein causing said adjustment comprises establishing a desired liquid phase mass flow rate.

4. The method as recited in claim 1, wherein causing said adjustment comprises establishing a desired gas phase mass flow rate.

5. The method as recited in claim 1, wherein causing said adjustment comprises substantially stopping said multiphase flow.

6. The method as recited in claim 1, wherein causing said adjustment comprises substantially eliminating the liquid phase from the multiphase flow.

7. The method as recited in claim 1, wherein said mass flow rate of at least one phase of the multiphase flow comprises a gas phase mass flow rate.

8. The method as recited in claim 1, wherein said mass flow rate of at least one phase of the multiphase flow comprises a liquid phase mass flow rate.

9. The method as recited in claim 1, further comprising determining a total mass flow rate of the multiphase flow.

10. The method as recited in claim 1, further comprising recording a time history of variations in production of at least one phase of the multiphase flow.

11. The method as recited in claim 1, further comprising calculating a total amount of at least one of the phases of the multiphase flow produced during a given time period.

12. The method as recited in claim 1, further comprising recording a time history of variations in production of at least the multiphase flow.

13. The method as recited in claim 1, further comprising generating a warning when said mass flow rate of at least one phase of the multiphase flow meets a predetermined criterion.

14. The method as recited in claim 1, further comprising determining a molecular weight of at least one phase of the multiphase flow.

15. The method as recited in claim 1, wherein measuring at least two pressure differentials of the multiphase flow comprises:

monitoring pressure at a plurality of points in the multiphase flow;

selecting pressure readings from at least three of said plurality of points; and determining said at least two pressure differentials from said pressure readings.

16. The method as recited in claim 1, further comprising:

determining said mass flow rate of at least one phase of said multiphase flow with a gamma ray attenuation densitometer.

17. The method as recited in claim 1, further comprising determining said mass flow rate of at least one phase of said multiphase flow with an ultrasonic film thickness measuring apparatus.

18. The method as recited in claim 1, further comprising determining said mass flow rate of at least one of the phases of said multiphase flow by measuring a film thickness of said at least one phase of the multiphase flow.

19. In an oil field having at least one well for facilitating control of a high void fraction multiphase flow, the high void fraction multiphase flow having at least a gas phase and a liquid phase, and the high void fraction multiphase flow passing through an extended throat venturi, a method for managing operation of the at least one well, the method comprising:

measuring first and second pressure differentials of the high void fraction multiphase flow in the extended throat venturi;

determining a gas phase mass flow rate by:

determining a normalized gas phase mass flow rate based on said first and second pressure differentials; and using said normalized gas phase mass flow rate, a gas density, and a contraction ratio of the extended throat venturi to obtain said gas phase mass flow rate;

using said gas phase mass flow rate to determine whether adjustment is required with respect to the high void fraction multiphase flow; and causing, as required, the at least one well to implement any adjustment indicated by said gas phase mass flow rate.

20. The method as recited in claim 19, further comprising determining a molecular weight of at least one phase of the high void fraction multiphase flow.

21. The method as recited in claim 19, further comprising generating a warning when said gas phase mass flow rate meets a predetermined criterion.

22. The method as recited in claim 19, further comprising recording a time history of variations in production of at least the gas phase of the high void fraction multiphase flow.

23. The method as recited in claim 19, further comprising calculating a total amount of at least one phase of the high void fraction multiphase flow produced during a given time period.

24. The method as recited in claim 19, wherein using said gas phase mass flow rate to determine whether adjustment is required with respect to the high void fraction multiphase flow comprises:

correlating said adjustment with at least one predetermined criterion; and comparing said gas phase mass flow rate to said at least one predetermined criterion.

25. The method as recited in claim 19, wherein causing said adjustment comprises establishing a desired gas phase mass flow rate.

26. The method as recited in claim 19, wherein causing said adjustment comprises substantially eliminating the liquid phase from said high void fraction multiphase flow.

27. The method as recited in claim 19, wherein causing said adjustment comprises substantially eliminating the gas phase from said high void fraction multiphase flow.

28. The method as recited in claim 19, further comprising determining a film thickness of a liquid phase.

29. The method as recited in claim 19, further comprising determining a liquid phase mass flow rate.

30. The method as recited in claim 29, further comprising generating a warning when said liquid phase mass flow rate meets a predetermined criterion.

31. The method as recited in claim 29, wherein determining a liquid phase mass flow rate comprises:

determining a gas phase velocity in the extended throat based upon said gas phase mass flow rate;

determining a pressure drop experienced by the gas phase due to work performed on the gas phase in accelerating the liquid phase between a point located upstream of the extended throat venturi and a point located in the extended throat;

determining a liquid phase velocity based upon said pressure drop experienced by the gas phase;

determining a void fraction of the high void fraction multiphase flow; and determining the liquid phase mass flow rate based upon said liquid phase velocity and said void fraction.

32. The method as recited in claim 19, further comprising determining a total mass flow rate of the high void fraction multiphase flow.

33. The method as recited in claim 32, wherein determining a total mass flow rate of the high void fraction multiphase flow comprises:

determining a gas phase velocity in the extended throat based upon said gas phase mass flow rate;

determining a pressure drop experienced by the gas phase due to work performed on the gas phase in accelerating the liquid phase between a point located upstream of the extended throat venturi and a point located in the extended throat;

determining a liquid phase velocity based upon said pressure drop experienced by the gas phase;

determining a friction value between the liquid phase and the interior wall of the venturi based upon said liquid phase velocity; and determining a total mass flow rate of the high void fraction multiphase flow based upon a pressure differential across the extended throat, said friction value, and said gas phase velocity.

34. The method as recited in claim 32, further comprising determining a liquid phase mass flow rate by subtracting said gas phase mass flow rate from said total mass flow rate of the high void fraction multiphase flow.

35. In an oil field having at least one well for facilitating control of a multiphase flow having a gas phase, a liquid phase, and a liquid water phase, a method for managing operation of the at least one well, the method comprising:

determining a liquid water phase fraction;

measuring a plurality of pressure differentials of the multiphase flow;

determining a liquid water phase mass flow rate based upon said liquid water fraction and said plurality of pressure differentials;

determining a liquid phase mass flow rate based upon said plurality of pressure differentials;

using a mass flow rate of at least one of the phases of the multiphase flow to determine whether an adjustment is required with respect to the multiphase flow; and causing, as required, the at least one well to implement any adjustment indicated by said mass flow rate of at least one phase of the multiphase flow.

36. The method as recited in claim 35, wherein measuring at least two pressure differentials of the multiphase flow comprises:

monitoring pressure at a plurality of points in the multiphase flow;

selecting pressure readings from at least three of said plurality of points; and determining said plurality of pressure differentials from said pressure readings.

37. The method as recited in claim 35, further comprising determining a molecular weight of at least one of the phases of the multiphase flow.

38. The method as recited in claim 35, wherein implementation of said adjustment action comprises substantially eliminating the liquid phase and the liquid water phase from the multiphase flow.

39. The method as recited in claim 35, further comprising generating a warning when said liquid phase mass flow rate meets a predetermined criterion.

40. The method as recited in claim 35, further comprising generating a warning when said liquid water phase mass flow rate meets a predetermined criterion.

41. The method as recited in claim 35, further comprising recording a time history of variations in production of at least one of the phases of the multiphase flow.

42. In an oil field including at least one well for facilitating control of a multiphase flow having at least a gas phase and a liquid phase, an oil field management system for managing operation of the at least one well, the oil field management system comprising:

a differential pressure flow meter including:
an extended throat venturi disposed downstream of the at least one well, said extended throat venturi having a characteristic contraction ratio and including an extended throat section having an inlet and an outlet, said extended throat section having a length of at least ten times a diameter thereof, said extended throat section being disposed downstream from an inlet section of said extended throat venturi, and said extended throat venturi having at least first, second, and third pressure measuring points;

pressure monitoring means in communication with said first, second and third pressure measuring points so as to monitor at least first and second pressure differentials; and a flow processor for calculating a mass flow rate of at least one of the phases of the multiphase flow based upon said at least first and second pressure differentials; and a well control system operatively connected with the at least one well and with said differential pressure flow meter.

43. The oil field management system as recited in claim 42, further comprising a water cut meter in communication with the multiphase flow.

44. The oil field management system as recited in claim 42, further comprising a gas chromatograph in communication with the multiphase flow.

45. The oil field management system as recited in claim 42, further comprising a separator through which the multiphase flow passes.

46. The oil field management system as recited in claim 42, wherein said pressure monitoring means comprises a plurality of pressure transducers.

47. The oil field management system as recited in claim 42, wherein said flow processor for calculating a mass flow rate of at least one of the phases of the multiphase flow comprises a computer.

48. The oil field management system as recited in claim 42, wherein said flow processor for calculating a mass flow rate of at least one of the phases of the multiphase flow calculates a total amount of at least one of the phases of the multiphase flow produced during a given time period.

49. The oil field management system as recited in claim 42, wherein said flow processor for calculating a mass flow rate of at least one of the phases of the multiphase flow generates a time history of variations in production of at least one of the phases of the multiphase flow.

50. The oil field management system as recited in claim 42, wherein said flow processor for calculating a mass flow rate of at least one of the phases of the multiphase flow determines a gas phase mass flow rate by:

determining a normalized gas phase mass flow rate based on said first and second pressure differentials; and using said normalized gas phase mass flow rate, a gas density, and said contraction ratio of the extended throat venturi to obtain said gas phase mass flow rate.

51. The oil field management system as recited in claim 42, further comprising means for measuring temperature of the multiphase flow.

52. The oil field management system as recited in claim 51, wherein said means for measuring temperature of the multiphase flow is selected from the group consisting of: thermocouples, resistance thermometers, and thermistors.

53. In a chemical processing system, a method for controlling a liquid phase of a multiphase flow also having a gas phase, the method comprising:

measuring at least two pressure differentials of the multiphase flow;

determining at least a liquid phase mass flow rate based upon said at least two pressure differentials;

using said liquid phase mass flow rate to determine whether adjustment is required with respect to the multiphase flow; and implementing, as required, any adjustment indicated by said liquid phase mass flow rate.

54. The method as recited in claim 53, further comprising generating a warning when said liquid phase mass flow rate meets a predetermined criterion.

* * * * *